United States Patent [19]
Zawisa et al.

[11] Patent Number: 5,308,116
[45] Date of Patent: May 3, 1994

[54] REAR SEAT SHOULDER BELT GUIDE

[75] Inventors: Kenneth M. Zawisa, Farmington Hills; Gregory S. Ches, Clinton Township, Macomb County; Richard D. Loose, Birmingham; Michael J. Wendzinski, Grosse Pointe, all of Mich.

[73] Assignee: General Motors Corporation, Detroit, Mich.

[21] Appl. No.: 982,913

[22] Filed: Nov. 30, 1992

[51] Int. Cl.⁵ .............................................. B60R 22/00
[52] U.S. Cl. ..................................... 280/808; 297/483
[58] Field of Search .......................... 280/808, 801 R; 297/482, 468, 483

[56] References Cited

U.S. PATENT DOCUMENTS

| | | | |
|---|---|---|---|
| 3,567,247 | 3/1971 | Sobkow et al. | 280/808 |
| 4,461,510 | 7/1984 | Cunningham et al. | 297/487 X |
| 4,609,205 | 9/1986 | McKeever | 280/808 |
| 4,648,625 | 3/1987 | Lynch | 280/808 |
| 4,799,737 | 1/1989 | Greene | 280/808 |
| 4,832,366 | 5/1989 | Corbett et al. | 280/808 |
| 4,840,404 | 6/1989 | Falterman | 280/808 |
| 5,060,976 | 10/1991 | Boone | 280/801 R |

FOREIGN PATENT DOCUMENTS 3438372  4/1966  Fed. Rep. of Germany ...... 280/808

*Primary Examiner*—Margaret A. Focarino
*Assistant Examiner*—Christopher P. Ellis
*Attorney, Agent, or Firm*—Charles E. Leahy

[57] ABSTRACT

A rear seat shoulder belt guide for a vehicle having a rear seat shoulder belt allowing for adjustment of the routing of the shoulder belt for smaller than average passengers. The rear seat shoulder belt guide is detachably connected to the shoulder belt and may be removed when not in use. A tab is mounted to the vehicle side trim adjacent the rear seat back cushion and is designed to retain the shoulder belt guide when not in use while also being hidden from view from the vehicle's passenger compartment.

6 Claims, 3 Drawing Sheets

REAR SEAT SHOULDER BELT GUIDE

The present invention relates to rear seat shoulder belts and more particularly to an apparatus that adjusts the routing of a standard rear seat shoulder belt in a passenger compartment of a vehicle.

BACKGROUND OF THE INVENTION

It is well known to provide rear seat passenger compartments of vehicles with a seat belt that comprises of a shoulder belt in combination with a lap belt. The lap belt lies across the lap or waist of the passenger while the shoulder belt routes across the torso and shoulder of the passenger. It is known to utilize an anchor ring extending through a seat back for rerouting the path of a shoulder belt. It is also known to use a strap in conjunction with an elastic self-retracting feature for relieving the tension on a shoulder belt. It would be desirable to provide a detachable and slidable shoulder belt guide in conjunction with an elastic cord to adjust the routing of a shoulder belt over a passenger's torso while also providing a means to store the shoulder belt guide in a non-visible location when not in use.

SUMMARY OF THE INVENTION

The present invention provides a rear seat shoulder belt guide that adjusts the routing of a rear seat shoulder belt to extend or travel across the torso and shoulder of a passenger. The shoulder belt guide fits over the shoulder belt and can slide along the shoulder belt so as to adjust for different size passengers. The shoulder belt guide is also detachable from the shoulder belt so as to accommodate passengers who do not wish to utilize the guide. The present invention provides a tab designed to have the guide snugly slide over the tab and retain the guide in a stowed position when the guide is not in use. The tab may be mounted to a side trim adjacent to the rear seat back cushion so as to be hidden from view from the passenger compartment.

In the preferred form, the present invention is utilized in a vehicle having a rear seat back cushion adjacent to a side trim and having a shoulder belt extending from a retractor at the top of the rear seat back cushion to a seat belt buckle at the bottom of the rear seat back cushion. A tab is pivotally connected to the side trim adjacent the rear seat back cushion. Back cushion covers the tab thereby hiding the tab from view from the passenger compartment. An elastic cord is also pivotally connected to the side trim at one of its ends while having its other end pivotally connected to a C-shaped guide. The shoulder belt is inserted through an opening in the C-shaped guide so that the C-shaped guide wraps around the shoulder belt. The friction fit of the C-shaped guide allows the C-shaped guide to slide along the length of the shoulder belt to adjustment for different size passengers. The length of the elastic cord is designed to pull the C-shaped guide toward the side trim thereby adjusting the routing of the shoulder belt over the passenger's shoulder. The C-shaped guide may be detached from the shoulder belt and retained on the tab. The tab is designed such that the opening provided in the C-shaped guide snugly slides over the tab so as to retain the C-shaped guide in a stowed position when not in use.

Thus, the objects of the present invention are to provide a new and improved rear seat shoulder belt guide that is detachably and slidably connected to a shoulder belt to allow for adjustment of the routing of the shoulder belt; to provide a new and improved rear seat shoulder belt guide that provides for the retention of the C-shaped guide in a stowed position when the C-shaped guide is not in use; and to provide a new and improved rear seat shoulder belt guide that is hidden from the passenger compartment's view when in the stowed position.

DESCRIPTION OF THE PREFERRED EMBODIMENTS

Figure 1:
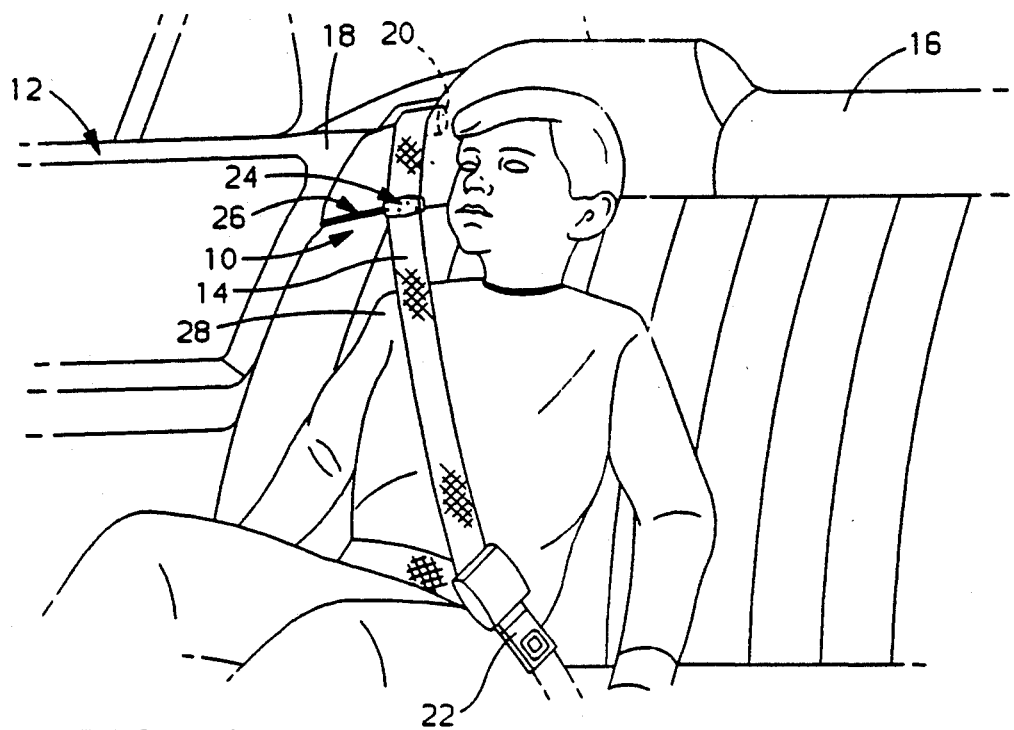
FIG. 1 is a perspective view showing the present invention being utilized on a rear seat shoulder belt in a passenger compartment of a vehicle.

Referring to the drawings, the present invention will now be described in detail with reference to the preferred embodiment.

FIG. 1 is a perspective view showing the present invention in its typical application. The rear seat shoulder belt guide (10) is utilized in a vehicle (12) containing a rear seat shoulder belt (14), a rear seat back cushion (16), and a side trim (18). The rear seat shoulder belt (14) extends from a retractor (20) at the top of the rear seat back cushion (16) to a buckle (22) at the bottom of the rear seat back cushion (16). The C-shaped guide (24) of the present invention connects to the shoulder belt (14) and is pulled toward the side trim (18) of the vehicle (12) by means of a tether or elastic cord (26) that is anchored to the side trim (18). By pulling the shoulder belt (14) toward the side trim (18), the routing of the shoulder belt (14) is adjusted to route over a passenger's shoulder and torso (28). The elastic cord (26) also allows the passenger (28) to move freely by stretching with passenger (28) movement.

Figure 2:
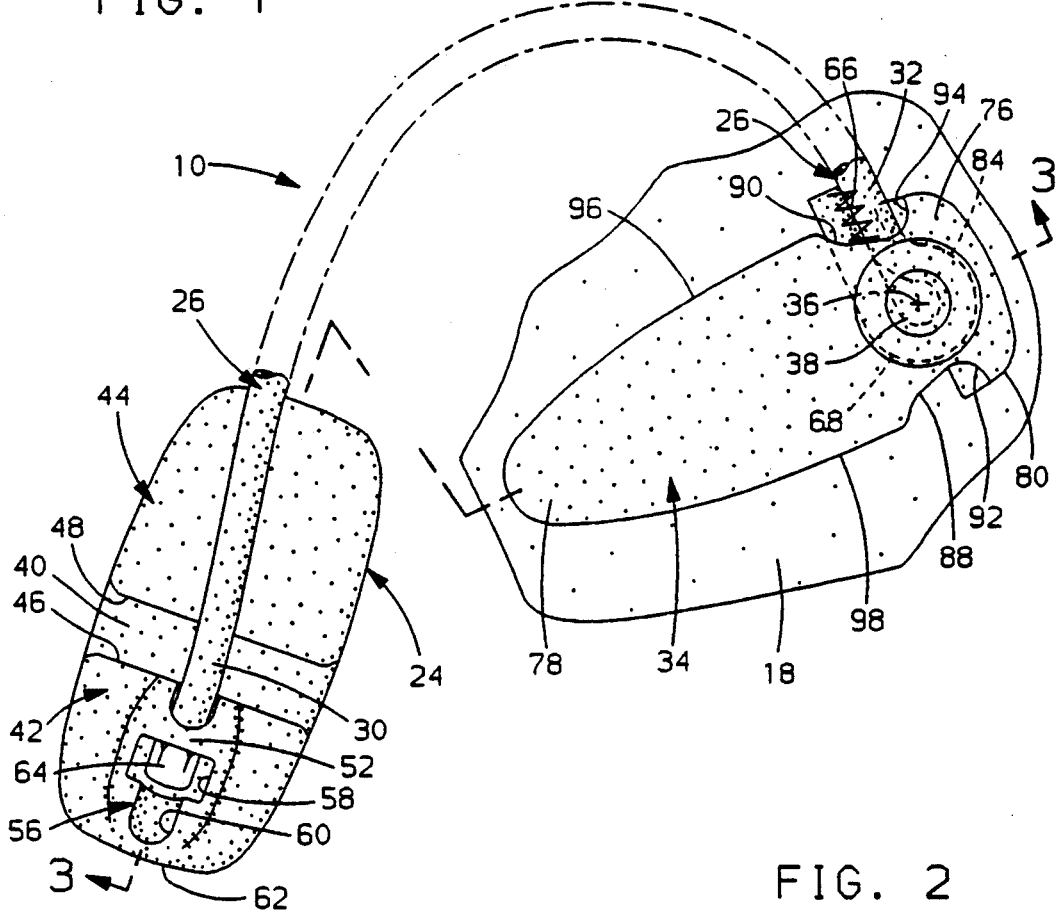
FIG. 2 is a side view showing the tab and one end of the elastic cord are connected to a side trim by a push-in retainer, and the other end of the elastic cord connected to the C-shaped guide.
Figure 3:
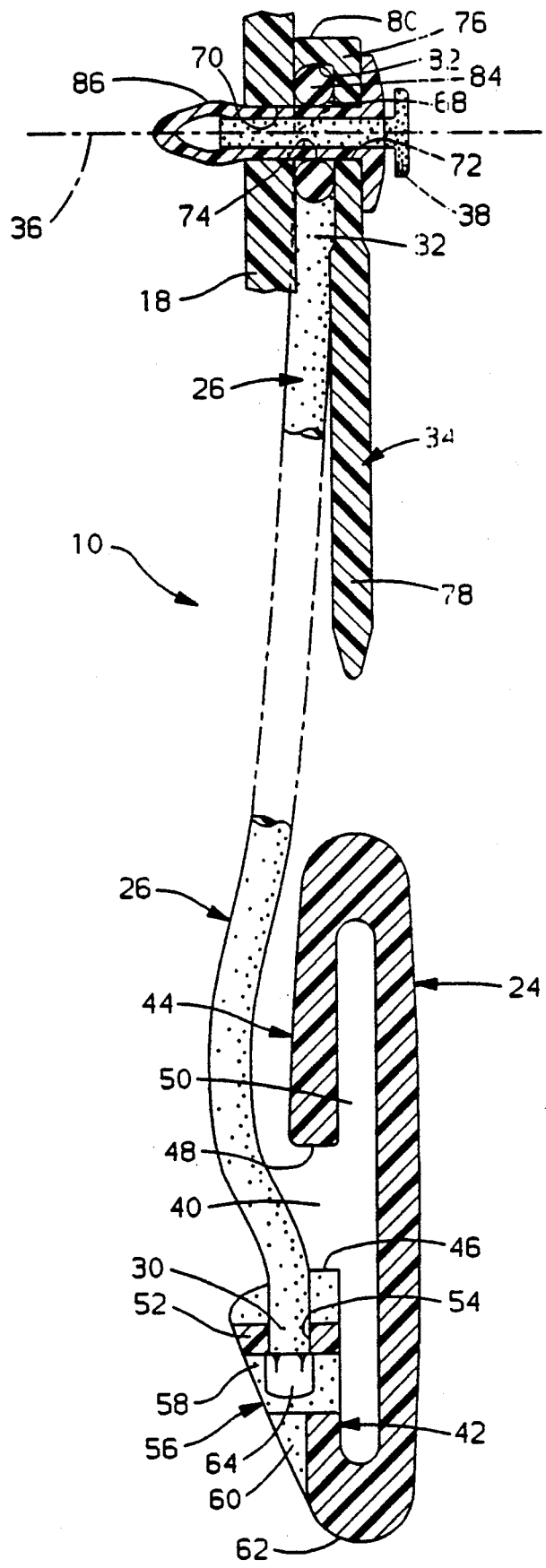
FIG. 3 is a sectional view of line 3—3 of FIG. 2 showing the tab and one end of the elastic cord connected to the side trim, and the other end of the elastic cord connected to the C-shaped guide.
Figure 4:
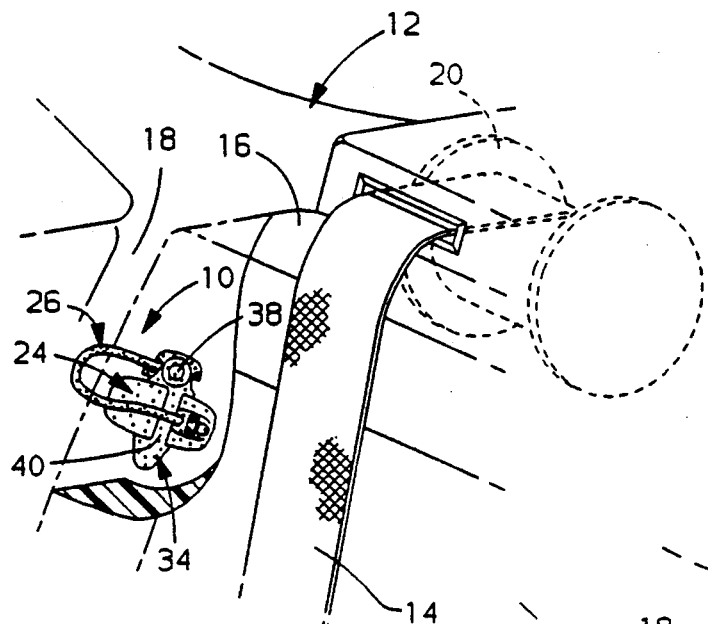
FIG. 4 is a perspective view with the rear seat back cushion cutaway showing the present invention in a stowed position.
Figure 6:
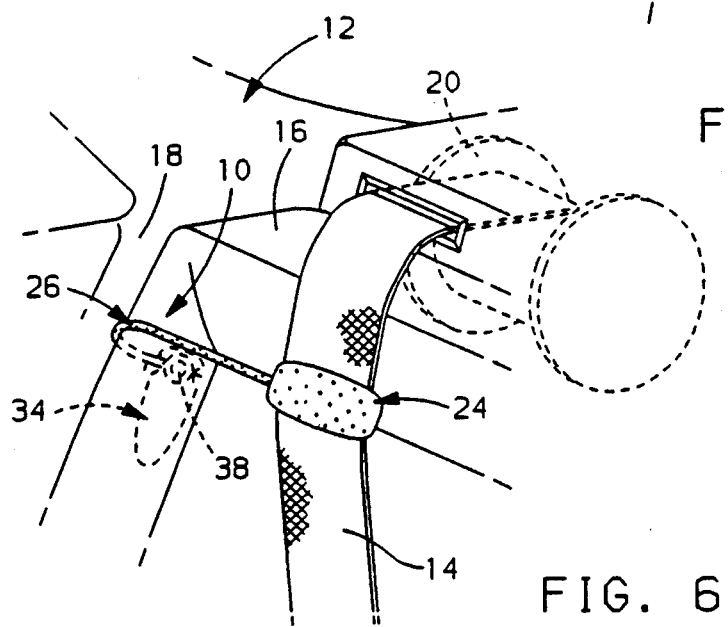
FIG. 6 shows a perspective view of the present invention being used to adjust the routing of a rear seat shoulder belt.

As seen in FIG. 2, the rear seat shoulder belt guide (10) is comprised of the C-shaped guide (24) being pivotally connected to one end (30) of the elastic cord (26) and having the other end (32) of the elastic cord (26) pivotally connected to the side trim (18) of the vehicle (12). In the preferred embodiment, the elastic cord (26) and a tab (34) are pivotally connected to the side trim (18) of the vehicle through a common axis (36) of a push-in plastic retainer (38), as seen in FIG. 3. When in use, the C-shaped guide (24) wraps around the rear seat shoulder belt (14) and is pulled toward the side trim (18) by the elastic cord (26) having a length designed such that the elastic cord (26) stretches and provides an elastic retention force on the C-shaped guide (24), as seen in FIG. 6. When not in use, the C-shaped guide (24) is designed to snugly slide over the tab (34) thereby retaining and establishing a stowed position for the C-shaped guide (24), as seen in FIG. 4.

The C-shaped guide (24) is fabricated from a molded plastic and is constructed into a rounded corner rectangular shape having a C-shaped cross section, as seen in FIG. 3. The C-shaped guide (24) provides a small opening (40) between a pair of legs (42),(44) having opposing ends (46),(48) with one of the legs (42) being shorter than the other leg (44). The small opening (40) leads into a larger opening (50) thus allowing the shoulder belt (14) to be folded and inserted through the smaller opening (40) and unfolded into the larger opening (50). By having the pair of legs (42),(44) of the C-shaped guide (24) extend over the shoulder belt (14), the shoulder belt (14) is retained within the larger opening (50) of the C-shaped guide (24). The short leg (42) of the C-shaped guide (24) has a rib or shelf (52) molded integral with and extending outward from the short leg (42). The rib (52) has a hole (54) extending through the end (46) of the short leg (42) of the C-shaped guide (24). A slot (56) is provided in the rib (52) of the short leg (42) and intersects with the hole (54) in the short leg (42). The slot (56) has two widths (58),(60); a larger width (58) starting towards the end (46) of the small leg and extending through the short leg (42) and a smaller width (60) integral with the larger width (58) and extending away from the end (46) of the short leg (42) toward a rounded corner (62) of the C-shaped guide (24). The elastic cord (26) has one of its ends (30) extending through the hole (54) in the end (46) of the short leg (42) of the C-shaped guide (24), and into the larger width (58) of the slot (56) provided in the short leg (42). A metallic retainer cap (64) is crimped or swaged onto the end (30) of the elastic cord (26) and is designed such that it fits within the larger width (58) of the slot (56) while being larger than the smaller width (60) of the slot (56). The retainer cap (64) is also larger than the hole (54) in the short leg (42) thus allowing the retainer cap (64) to be secured within the larger width (58) of the slot (56) thereby securing the elastic cord (26) to the C-shaped guide (24). The retainer cap (64) is substantially circular thereby allowing it to pivot and rotate within the larger width (58) of the slot (56) in the C-shaped guide (24).

The other end (32) of the elastic cord (26) is folded back and sewn to a portion (66) of the elastic cord (26) to form a loop (68) at the end (32) of the elastic cord (26), as seen in FIGS. 2 and 3. As seen in FIG. 3, the loop (68) of the elastic cord is mounted between the side trim (18) of the vehicle (12) and the tab (34). A hole (70) extends through the side trim (18) and is in common alignment with a hole (72) extending through the tab (34) and the opening (74) provided in the loop (68) of the elastic cord (26). The plastic push-in retainer (38) is inserted through the commonly aligned holes (70),(72) and opening (74) so as to provide a common axis (36) and a pivotal connection for the elastic cord (26) and the tab (34) relative to the side trim (38). It should also be noted that the present invention is not limited to the elastic cord (26) and the tab (34) utilizing a common retainer (38), rather the elastic cord (26) and tab (34) could be secured to the side trim (18) separately, yet still being close enough together for the C-shaped guide (24) to slide onto the tab (34) and establish a stowed position.

The tab (34) is fabricated from a molded plastic and has a substantially elliptical shape. The tab (34) has a first end (76) and second end (78) so that the first end (76) provides the hole (72) where the push-in fastener (38) is inserted. The first end (76) of the tab (34) also provides a lip (80) integral with and extending from the first end (76) of the tab (34), as seen in FIG. 3. The lip (80) extends toward the side trim (18) of the vehicle (12) and provides a recess (82) in the center of the inside radius of the lip (80). A portion (84) of the loop (68) in the elastic cord (26) is seated within the recess (82) of the lip (80) causing the edge of the lip (80) to extend over the portion (84) of the loop (68) seated in the recess (82). By having the push-in retainer (38) inserted through the hole (72) of the tab (34) and through the opening (74) in the loop (68) of the elastic cord (26), the loop (68) is captured in the recess (82). The retainer's (38) push-in retaining feature provides an expanded barrel (86) which prevents the retainer (38) from becoming disassembled from the tab (34) and the loop (68) of the elastic cord (26). This ensures that the elastic cord (26) will be secured to the retainer (38) and the tab (34) during shipping as the retainer (38), tab (34) and elastic cord (26) are typically assembled prior to shipping.

As seen in FIG. 2, the tab (34) is also provided with a pair of opposite-sided recesses (88),(90) starting from ends (92),(94) of the lip (80) and extending outward to the sides (96),(98) of the tab (34). The recesses (88),(90) start with their deepest penetration into the tab (34) at the ends (92),(94) of the lip (80) and taper outward toward the sides (96),(98) of the tab (34). The recesses (88),(90) are utilized when a passenger (28) pulls the elastic cord (26) to rotate the tab (34) to a more favorable position for accessing the tab (34) and C-shaped guide (24).

Figure 5:
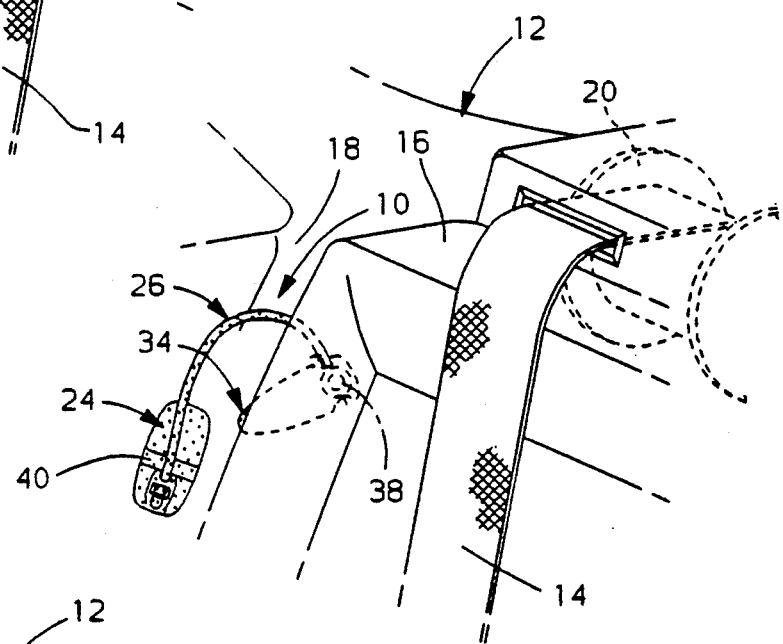
FIG. 5 is a perspective view showing the present invention in an unstowed position while having the C-shaped guide detached from the shoulder belt.

The tab (34) is designed to snugly fit within the larger opening (50) provided in the C-shaped guide (24) so as to establish a stowed position when the C-shaped guide (24) is not in use, as seen in FIG. 4. By having the C-shaped guide (24) retained on the tab (34), and by having the tab (34) mounted to the side trim (18) adjacent the rear seat back cushion (16), the rear seat shoulder belt guide (24) is hidden from view from the passenger compartment when in the stowed position. When the passenger (28) decides to utilize the rear seat shoulder belt guide (10), the elastic cord (26) is pulled by the passenger (28), and the tab (34) is rotated to a more favorable position for removing the C-shaped guide (24) from the tab (34), as seen in FIG. 5. The shoulder belt (14) is then inserted through the smaller opening (40) of the C-shaped guide (24) and extended within the larger opening (50) of the C-shaped guide (24), as seen in FIG. 6. The elastic cord (26) has a length designed to apply the proper elastic retention force for pulling the shoulder belt (14) toward the side trim (18) of the vehicle (12) thus adjusting the routing of the shoulder belt (14). This provides a more comfortable routing of the shoulder belt (14) for passengers (28), as the shoulder belt's routing is adjusted to extend over the shoulder and torso of the passenger (28). When the passenger (28) decides not to utilize the C-shaped guide (24), the passenger (28) disconnect the C-shaped guide (24) from the shoulder belt (14) and slides the C-shaped guide (24) over the tab (34). The tab (34) may then be concealed by rotating the tab (34) behind the rear seat back cushion (16). During hard braking of the vehicle (12), the elastic cord (32) will stretch upon the locking of the retractor (20) thereby preventing any damage to the rear seat shoulder belt guide (10).

The foregoing description is of a preferred embodiment of the invention, and it will be understood by those of ordinary skill in the art that various modifications and changes may be made without departing from the scope of the invention as defined in the claims.

The embodiments of the invention in which an exclusive property of privilege is claimed are defined as follows:

1. A rear seat shoulder belt guide for adjusting the routing of a standard rear seat shoulder belt in a passenger compartment of a vehicle wherein said vehicle has a rear seat back cushion and a side trim adjacent said rear seat back cushion comprising:

a C-shaped guide having an opening wherein said shoulder belt may be removably inserted and friction fittingly held by said C-shaped guide, and said friction fit of the C-shaped guide to the shoulder belt having the ability to slide along the length of said shoulder belt;

a tether connecting said C-shaped guide to said side trim and pulling said C-shaped guide to adjust the routing of said shoulder belt; and a tab connected to said side trim to be engaged within the opening of the C-shaped guide and thereby retain said C-shaped guide in a stowed position when said C-shaped guide is removed from the shoulder best and not in use.

2. The rear seat shoulder belt guide of claim 1 wherein said tether connecting said C-shaped guide to said side trim comprises:

an elastic cord having a first end and second end with said first end being pivotally connected to said side trim and said second end being pivotally connected to said C-shaped guide.

3. The rear seat shoulder belt guide of claim 1 comprising:

said tab being designed to snugly fit within said opening provided in said C-shaped guide and having said C-shaped guide slide over said tab through said opening thereby retaining said C-shaped guide in a stowed position when not in use.

4. A rear seat shoulder belt guide for adjusting the routing of a standard rear seat shoulder belt in a passenger compartment of a vehicle wherein said vehicle has a rear seat back cushion and a side trim adjacent said rear seat back cushion comprising:

said side trim having a hole hidden from view from said passenger compartment;

a substantially elliptical tab having a first end and a second end and having a hole at said first end;

a plastic push-in fastener inserted through said hole of said tab and through said hole of said vehicle side trim thereby pivotally connecting said tab to said vehicle side trim and said tab being hidden from view from said passenger compartment;

an elastic cord having a first end and a second end and having said first end of said elastic cord sewn to form a loop wherein said push-in fastener is inserted through said loop wherein said loop lies between said tab and said vehicle side trim thereby pivotally connecting said elastic cord to said side trim and said tab;

a plastic C-shaped guide having an opening whereby said shoulder belt may be removably inserted and held by said C-shaped guide and said C-shaped guide having the ability to slide along the length of said shoulder belt;

said plastic C-shaped guide having opposing ends and one of said opposing ends having a hole larger than said second end of said elastic cord and said second end of said elastic cord extending through said hole in said one opposing end of said C-shaped guide;

a retainer cap connected to said second end of said elastic cord and said retainer cap being larger than said hole in said C-shaped guide thereby pivotally connecting said elastic cord to said C-shaped guide; and said elastic cord pulling said C-shaped guide to adjust the routing of said shoulder belt when in use.

5. The rear seat shoulder belt guide of claim 4 comprising:

said substantially elliptical tab being designed to snugly fit within said opening provided in said C-shaped guide and having said C-shaped guide slide over said substantially elliptical tab through said opening thereby retaining said C-shaped guide in a stowed position when not in use.

6. The rear seat shoulder belt guide of claim 4 comprising:

said tab having opposite sides;

a lip integral with and extending outward from said first end of said tab and said lip having opposite ends and a first recess between said opposite ends for capturing a portion of said loop of said elastic cord thereby securing said elastic cord to said retainer during shipping; and a pair of second recesses in said opposite sides of said tab starting at said opposite ends of said lip and continuing away from said lip and having said elastic cord seat in one of said recesses and contacting one of laid opposite ends of said lip upon the pulling of said elastic cord thereby rotating said tab in a favorable position for stowing and unstowing said C-shaped guide.

* * * * *